United States Patent [19]
Brite

[11] 3,937,634
[45] Feb. 10, 1976

[54] OVEN CLEANING PROCESS

[76] Inventor: Alan D. Brite, 114 S. Canyon View Road, Los Angeles, Calif. 90049

[22] Filed: May 3, 1974

[21] Appl. No.: 466,786

Related U.S. Application Data

[63] Continuation-in-part of Ser. No. 297,720, Oct. 16, 1972, abandoned.

[52] U.S. Cl............ 134/2; 23/282; 134/22 R; 134/31; 134/40; 252/157
[51] Int. Cl.² .......................................... B08B 9/00
[58] Field of Search ......... 134/2, 19, 22 R, 31, 40; 23/282; 252/90, 157, 188.3 R, 384

[56] References Cited
UNITED STATES PATENTS

| | | | |
|---|---|---|---|
| 3,196,046 | 7/1965 | Brite | 134/30 X |
| 3,374,742 | 3/1968 | Brite | 23/282 X |
| 3,574,561 | 4/1971 | Nickerson et al. | 23/282 |
| 3,584,098 | 6/1971 | Adams | 252/157 X |

Primary Examiner—Robert L. Lindsay, Jr.
Assistant Examiner—Marc L. Caroff
Attorney, Agent, or Firm—Lyon & Lyon

[57] ABSTRACT

An exothermic reaction is produced by the addition of water to a mixture of calcium oxide, an ammonium salt and pine oil. The mixture is included within a disposable container having means therein for receiving the water and controlling the progress thereof to the mixture. After the water is added to the container, the container is enclosed within an oven and the resulting exothermic reaction and the simultaneous liberation of ammonia from the ammonium salt causes ammonia gas, steam, and pine oil to exit from the container depositing on the oven walls ammonium hydroxide and the pine oil which exert a cleaning, dissolving, and saponifying action on grease and other foreign matter.

7 Claims, 4 Drawing Figures

U.S. Patent    Feb. 10, 1976    3,937,634
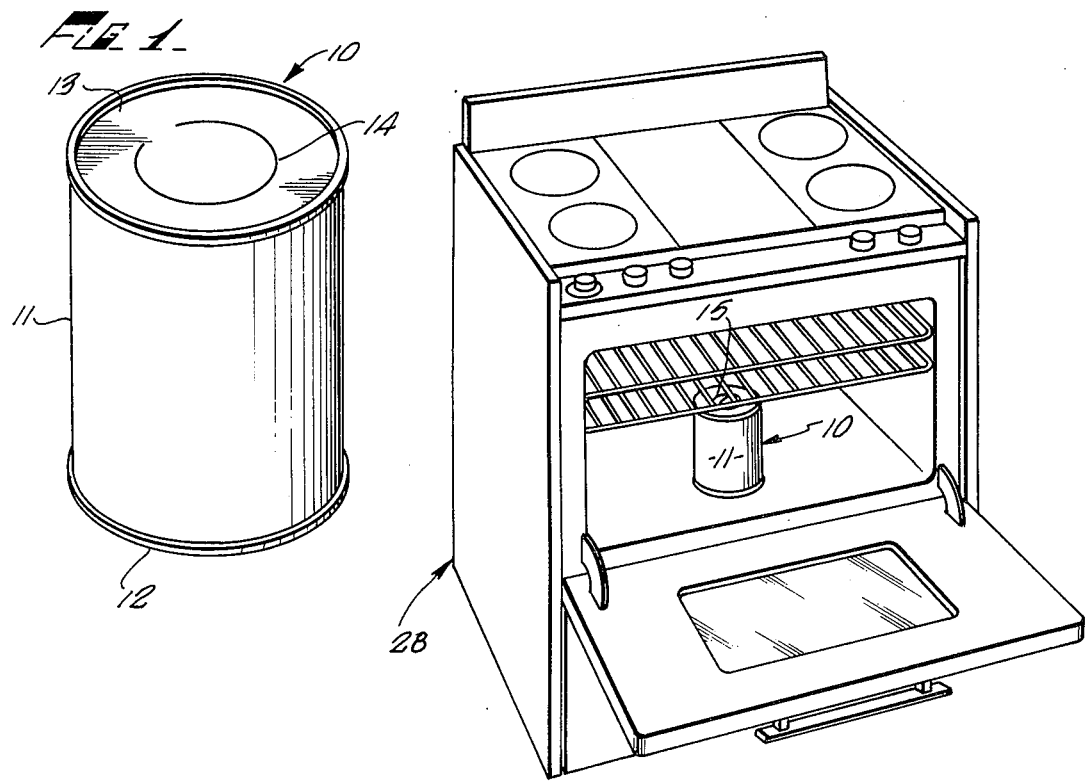
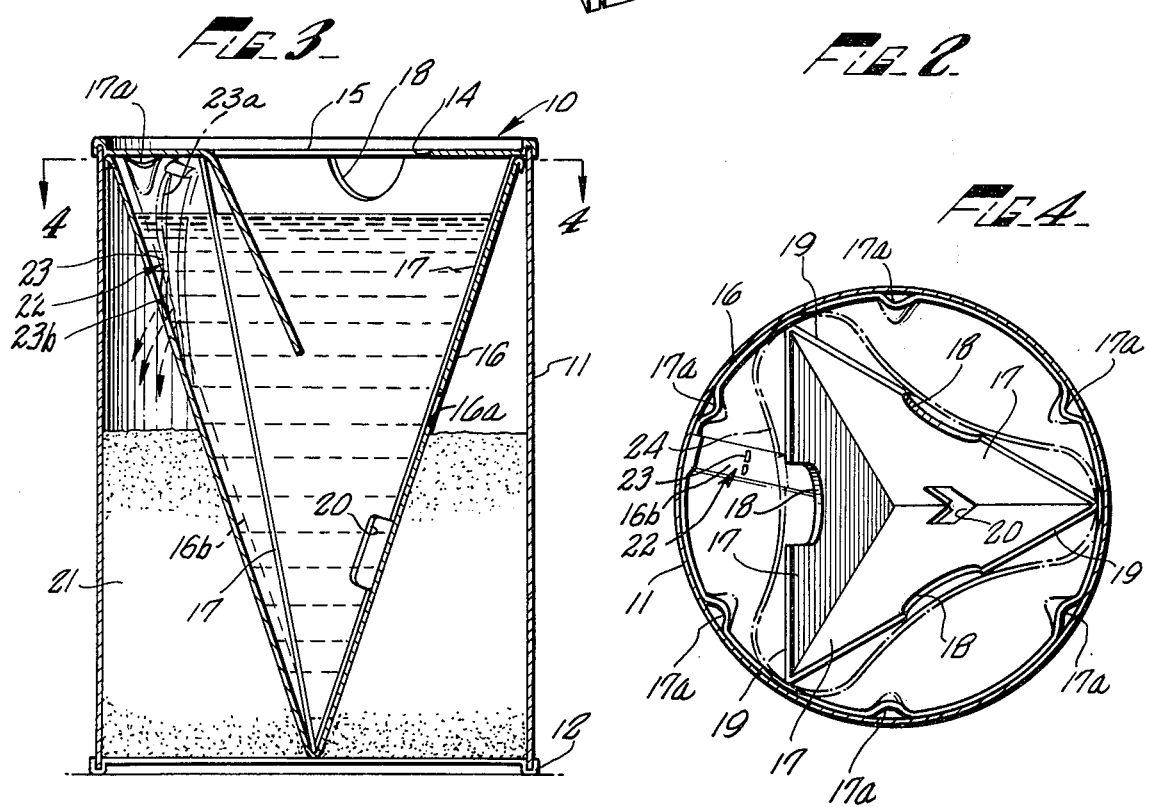

OVEN CLEANING PROCESS

This Application is a continuation-in-part of my U.S. Pat. Application, Ser. No. 297,720 for an Article and Process for Cleaning Ovens and the Like which was filed on Oct. 16, 1972, and now abandoned.

The invention of this Application relates to the art of cleaning and has particular reference to an improved process and article for cleaning grease and food stained surfaces such as those found in household cooking ovens.

One of the most difficult and poorly performed tasks which faces the modern housewife is that of cleaning the soiled interior surfaces of the oven. Many preparations have been devised and sold specifically for this purpose, but several of the more effective preparations for removing the food and grease stains contain caustic or other corrosive chemicals which are difficult and significantly dangerous to apply. My U.S. Pat. No. 3,051,599, dated Aug. 28, 1962, and U.S. Pat. No. 3,196,046, dated July 20, 1965, disclose, respectively, an article and process for cleaning the interior surfaces of ovens and the like which are safe to use and substantially easier to use than these other preparations containing corrosive chemicals. The present invention represents not only an improvement over these previously used preparations, but also an improvement over the article and process of my above identified United States Patents.

In the article and process of these patents the use of a contained mixture comprising calcium oxide in lump form and an ammonium salt in granular or powder form is disclosed. During use, water is added to the container and subsequently, progresses to the mixture. The contact of the water with the calcium oxide produces the usual exothermic reaction thereby forming steam. Simultaneously, ammonia gas is liberated from the ammonium salt and the mixture of ammonia gas and steam thus formed contacts the relatively cold interior surfaces of the oven, condensing the steam and depositing the ammonia thereon in the form of ammonium hydroxide which exerts a cleaning, saponifying, and dissolving action on the grease and other foreign matter on the surfaces. Although a relatively effective cleaning agent is provided by such means there are certain disadvantages associated therewith.

Several disadvantages are associated with the lump form of the calcium oxide and the effect thereof on the overall process. Generally, this form of the calcium oxide is more difficult to handle and package than a granular form because the irregular shape of the lumps interferes with various manufacturing steps such as measuring and pouring of the calcium oxide and thus renders the manufacture of the article less efficient. Moreover, the combination of calcium oxide in lump form with ammonium salt in granular form in the container precludes a uniform distribution of the two materials in the container since the smaller ammonium salt granules gravitate to the bottom of the container. As a result of this non-uniform distribution generally a slower, less active and cooler exothermic reaction is effected and a less effective cleaning process provided. Aside from this, the extended reaction time is in itself somewhat undesireable in that it extends the overall time during which ammonia gas is generated and, as a result the lingering time, the rather noticeable odor of ammonia is also extended. This odor can sometimes be objectionable to the housewife if the kitchen is poorly ventilated. Heretofore, the reaction time was reduced in part by adding to the mixture boiling water, but this created the extra and inconvenient step of boiling the water before the article could be put to use.

However, a change in the form of the calcium oxide material was not previously contemplated for several reasons. First, the delayed and slower reaction caused by the lump form of calcium oxide provided sufficient time after the water was added to properly position the article in the oven and close the oven before the ammonia gas and steam began to generate from the article. Secondly, it was heretofore felt that an extended reaction time of at least 10–15 minutes was required to effect a proper cleaning and dissolving action.

Another disadvantage associated with my previous article and process involved the drying out of the ammonium hydroxide-grease mixture on the walls of the oven within a relatively short time period, about 35 minutes, after the reaction occurred. The mixture when dry renders removal thereof more difficult. The need to remove the mixture within a prescribed time period made the process less convenient and in some instances caused one to remove the mixture before the objectionable ammonia odor had entirely dissipated from the kitchen area. Previous attempts to use an agent which would avoid this drying out problem were tried, but such attempts proved unsuccessful in that the agent used heretofore contributed to the objectionable odor problem.

Therefore, it is a primary object to provide an improved article and process for cleaning ovens and the like of the type involving an exothermic reaction produced by the addition of water to a mixture of calcium oxide and ammonium salt. In accordance therewith, the present invention eliminates the use of calcium oxide in lump form and the disadvantages associated therewith, provides for control against premature generation of steam and ammonia, and further provides for a process having an unexpected improved cleaning effectiveness.

Another object and advantage of the present invention is the provision of an oven cleaning article and process which incorporates therein as a cleaning agent ammonium salt and which at the same time reduces any noticeable and objectionable odors sometimes associated with such a cleaning agent.

Another object of the present invention is to render removal of the cleaning agent and grease from the oven more convenient by preventing the drying out and hardening of the mixture of the agent and grease.

Still another object of the present invention is to provide an article and process for cleaning ovens which is safe and easy to use.

In order to accomplish these and other objects, the present invention briefly comprises a contained mixture of an ammonium salt, calcium oxide, and pine oil; the calcium oxide being in granular or particle form. Water is adapted to be added to the container and water control means within the container controls the progress of the water to the mixture. The water and calcium oxide produces an exothermic reaction which in turn causes a mixture of ammonia gas, steam and pine oil to exit from the container through a defined passage. The water control means initially retard the generation of steam and ammonia from the article after the water is introduced into the article to permit proper positioning of the container within a cleaning area.

A still further object of the present invention is to provide an oven cleaning article and process which is efficient and economical to manufacture.

Other objects and advantages of this invention will be made readily apparent from the following detailed description and the accompanying drawings.

Referring now to the drawings:

FIG. 1 is a perspective view of a preferred form of the article of the present invention.

FIG. 2 is a perspective view illustrating the article in place in an oven and ready for use.

FIG. 3 is a side sectional view of the article illustrating the water control means during use of the article.

FIG. 4 is a sectional view taken substantially on the line 4—4 of FIG. 3 further illustrating the water control means.

Referring now in detail to the drawings, the article of the present invention is generally indicated 10 and includes a generally cylindrical container 11, which may be of metal or formed of substantially airtight cardboard lined with foil, having a metal bottom 12 and top 13. The top 13 is preferably aluminum which can be punctured at 14 to provide a central opening 15 during use. Positioned within the container is a cone-shaped member 16 formed of resin impregnated paper or other material suitably treated to render it resistant to water. The cup member 16 is open at the top and is provided with one relatively small opening 16a, preferably about 3/32 inch in diameter, midway between the top and bottom or apex thereof to permit water to permeate slowly therethrough. Extending from the apex of the coned cup to the top thereof is an overlapping seam 16 b sealed by a suitable adhesive. Previously, it had been preferable to locate this water opening or openings at the bottom of the cup member to insure contact by the water first with the ammonium salt at the bottom of the container. However, it was not uncommon for some of the material of the mixture to pass over the top and into the cup member and clog these bottom openings thereby impeding the flow of water or merely clog the openings from the outside the cup.

The top of the cup member extends substantially to the underside of the container top 13 and the apex of the cup member is positioned on the container bottom 12. The cup member 16 is slightly creased at the upper open end to form passageways 17a between the cup member 16 and the sidewall and top of the container to initially permit the release of steam from the container past the cup member and out the central opening 15 during the reaction.

The cup member 16 is structurally supported from the inside by any convenient means such as stiffener or ribs 17 of cardboard or the like forming a pyramid shaped support structure. The stiffener ribs 17 are each provided with a slot opening 18 which extends a short distance from the upper edge 19 of the rib. One or more openings 20 of any convenient shape are provided in the ribs for the free passage of water from within the pyramid formed by the ribs 17 into the cup member 16.

An ammonia-generating chemical mixture 21 is contained in the volume of the container between the outer surface of the cup member and the inner surfaces of the inner sidewall and bottom. The mixture 21 comprises calcium oxide in granular or relatively fine particle size and an ammonium salt, such as chloride, sulphate, nitrate, carbonate, etc., in granular or powder form.

The type of calcium oxide found to be particularly suitable is manufactured by Pfizer Company, Minerals, Pigments and Metals Division, Lucerne Valley, Calif. and sold under the trade name SHASTAWITE GRANULE QUICK LIME. The particular material is produced according to a manufacturing process which includes crushing the lime into granule form before burning it. As a result the finished product includes granules with a glaze on the exterior surface which is beneficial to the present invention for reasons set forth below.

Also added to the mixture 21 is a solvent, a non-synthetic pine oil. A preferable type of such pine oil is manufactured by Hercules Incorporated, Wilmington, Delaware and is sold under the trade name YARMOR 302 W. The pine oil, besides acting as a solvent, is also advantageous in that it coats the calcium oxide and slows the reaction between the water and the calcium oxide and further acts as deodorizing disaffectant in the kitchen area. The glaze on the calcium oxide also slightly retards the reaction. Retardation of the reaction is important because it in part prevents premature generation of the steam and ammonia from the article. Moreover, the pine oil maintains the saponified grease on the walls of the oven after the reaction in a softened form for a substantial period of tme thereby permitting easy removal a substantial time after the reaction has occurred.

The mixture 21 preferably consists of about 350 grams of calcium oxide, 100 grams of ammonium chloride and 25 cc of pine oil.

In use of the article, the top 13 is punched open at 14 to provide a central opening and water, preferably hot tap water, is poured therethrough to fill the cup member 16. The container is then immediately placed in the oven 28 as indicated in FIG. 2. The oven should be unheated although unlike other caustic oven cleaners it is unnecessary to turn off the pilot or protect or remove any electrical parts in the oven. In addition, any vent openings thereof should be closed with a rag or other means.

After placing the article 10 in the oven, the oven door is closed. The water in the cup member seeps through the opening 16a into contact with the mixture. A small controlled amount of water first progresses relatively quickly and uniformly through the uniform granular mixture, contacting the calcium oxide with the usual exothermic reaction, forming steam. However, as indicated above the reaction is slightly delayed by the pine oil.

Because of the particular type of calcium oxide used and the uniform distribution of water therethrough, once the reaction begins the reaction progresses rapidly and produces a significantly high temperature in the oven of approximately 130°– 150°F.

A significant amount of steam is produced by this reaction within a relatively short period of time. For example, when fourteen ounces of water is added to the container 11 within two minutes approximately one ounce of steam vapor is produced. This vapor, together with the relatively high temperature of the reaction in the container, approximately 220°F, destroys the effectiveness of the adhesive or glue holding the cup member 16 together at the seam 16b whereby the cup member collapses and the remaining water therein floods the mixture 21. This flooding of the mixture 21 is desireable in that it produces a substantially improved performance. However, it is extremely important that this flooding be controlled and water control means, generally designated 22, are provided along the seam to maintain for a period of time the structural integrity of the cup and thereby control the flow of the water into the mixture. Absent such control it is possible that steam and ammonia might generate from the article before it is properly positioned within the oven and before the oven is closed. This can occur because the reaction now begins more rapidly than before when the water is initially introduced to the mixture through the opening 16a as a result of the form of the calcium oxide and the uniform distribution of the mixture. Thus, the collapse of the cup begins earlier and thus also the flooding of the mixture which triggers the generation of steam and ammonia intended for the closed oven. If the flooding is not controlled and all of the water is allowed to combine with the mixture at once, this generation of the steam and the ammonia may occur too soon. This is so if boiling water is inadvertently added to the mixture as has been the practice in the past. Preferably, the water control means comprises a fastner 23 in the form of a staple slightly above the midway point between the apex and the open end of the cup since most of the water is initially above this midway point. Other means in the form of water-proof tape or specifically located applications of waterproof or hot melt glue along the seam 16b might also be used as the water control means.

During operation, as shown in FIG. 3, the water control means 22 provides for a pair ports 23a and 23b between the staple 23 and the top of the cup and between the staple and the apex of the cup, respectively. These ports control the flow of water into the mixture and insure a proper and controlled reaction and the desired timing of the generation of the steam and ammonia. The water control means 22 also has the added benefit of avoiding premature generation of the steam and ammonia as a result of the cup collapsing too soon because of the seam having an insufficient amount of adhesive or because the water added is too hot and in itself initiates the deterioration of the seam or because of a combination of both. This is so since the water control means in these instances sufficiently maintains the structural integrity of the cup at the seam to avoid an instantaneous combination of all the water added with the mixture which might result in the undesired premature generation of steam and ammonia from the article.

The flooding produces an additional 2 to 3 ounces of steam vapor. Simultaneously during the forming of steam, ammonia gas is liberated from the ammonium chloride. The mixture of ammonia gas, steam and pine oil initially passes over the creased edges of the cup member 16, and then over and through the cup member after it has collapsed as indicated by the phantom lines 24 in FIG. 4, through the slotted openings 18. In a preferred embodiment the generation of steam and ammonia gas from the container 11 occurs within a time period of between about 3–7 minutes. The mixture arises out of the container opening 15 into the oven and contacts the cold walls thereof, condensing the steam and depositing the ammonia thereof in the form of ammonium hydroxide which along with the deposited pine oil exerts its cleaning, dissolving and saponifying action on the grease and other foreign matter on the oven walls. Substantially the entire reaction is completed within approximately seven minutes and after this period of time the ammonia odor begins to dissipate from the oven and kitchen and within about 35 minutes after the initial reaction this odor is substantially unnoticeable. During this time the pine oil maintains the mixture on the oven wall surfaces in the softened form. The oven wall surfaces and racks are then wiped clean. Where it was heretofore felt that a longer reaction time was necessary to produce proper cleaning results, it is now felt that because of the heat generated during the reaction and the forceful nature of the reaction substantially improved cleaning results will occur even though the reaction time period is significantly less. Moreover, the ammonium hydroxide and pine oil are thoroughly distributed throughout the entire oven as a result of the more active reaction and thereby effect still further cleaning advantages.

It is to be understood that the specific amounts of calcium oxide, ammonium salt, and pine oil recited above are not critical in that the amounts may be varied within rather wide limits, so long as sufficient calcium oxide is present to react with the ammonium salt and form the ammonia and steam. During manufacture of the article, the granular or fine particle size form of the calcium oxide and ammonium salt permits these materials to be easily added to the container. For example, the prescribed amounts of these materials may be poured into the container by automated means.

From the above description it will be understood that an improved article and process for cleaning ovens and the like has been provided by the present invention. The article is highly effective in use and yet it substantially reduces the reaction time heretofore associated with other similar type oven cleaning devices and processes. This reduced reaction time substantially reduces any problems associated with ammonia odors. It will be further understood that an important feature of the invention resides in providing the calcium oxide in granular form which effects a hotter reaction. This combined with the structural nature of the article, whereby the water admitted into the cup is combined quickly, but by a controlled process, with the entire mixture of calcium oxide, ammonium salt and pine oil, permits a most efficient dissolving of the ammonium salt and utilization of the steam produced by the slaking of the calcium oxide.

Having fully described my invention, it is to be understood that I do not wish to be limited to the detail set forth, but my invention is of the full scope of the appended claims.

I claim:

1. A method for cleaning ovens and the like comprising the steps of adding water to a container of a substantially uniform mixture of calcium oxide and ammonium salt, permitting a small amount of the water to initially combine with the mixture to initiate an exothermic reaction, enclosing said container in an oven, combining the rest of the water with the mixture quickly but by a controlled rate to complete the reaction and generate steam and ammonia gas from the container to be condensed on the inner surfaces of said oven and removing said condensate from said oven surfaces, said mixture of calcium oxide having a sufficiently fine particle size whereby mix generation of steam and ammonia gas from the container occurs within a time period of about between 3–7 minutes.

2. The method as defined in claim 1, wherein the temperature in the oven caused by the reaction is about between 130°–150°F.

3. The method as defined in claim 1, wherein said calcium oxide comprises a calcium oxide formed by a process wherein a step of crushing precedes a step of burning to provide a glazed exterior surface.

4. The method as defined in claim 1 wherein both said small amount of water and said rest of said water combine with said mixture by passing substantially downwardly into said mixture.

5. The method as defined in claim 1 wherein said calcium oxide is further defined as being coated with a solvent which maintains any saponified grease on the walls of the oven after said reaction in a softened form for a substantial period of time sufficient to permit said removal of said condensate.

6. The method as defined in claim 1 wherein said calcium oxide is further defined as being coated with pine oil.

7. A method for cleaning ovens and the like comprising the steps of adding water to a container of substantially uniform mixture of calcium oxide in fine particle size, pine oil and ammonium salt, permitting a small amount of the water to initially combine with the mixture to initiate an exothermic reaction, enclosing said container in an oven, combining the rest of the water with the mixture quickly but by a controlled rate to complete the reaction and generate steam and ammonia gas from the container to be condensed on the inner surfaces of said oven and removing said condensate from said oven surfaces, said mixture of calcium oxide having a sufficiently fine particle size whereby mix generation of steam and ammonia gas from the container occurs within a time period of about between 3–7 minutes.

* * * * *